Figure 1:
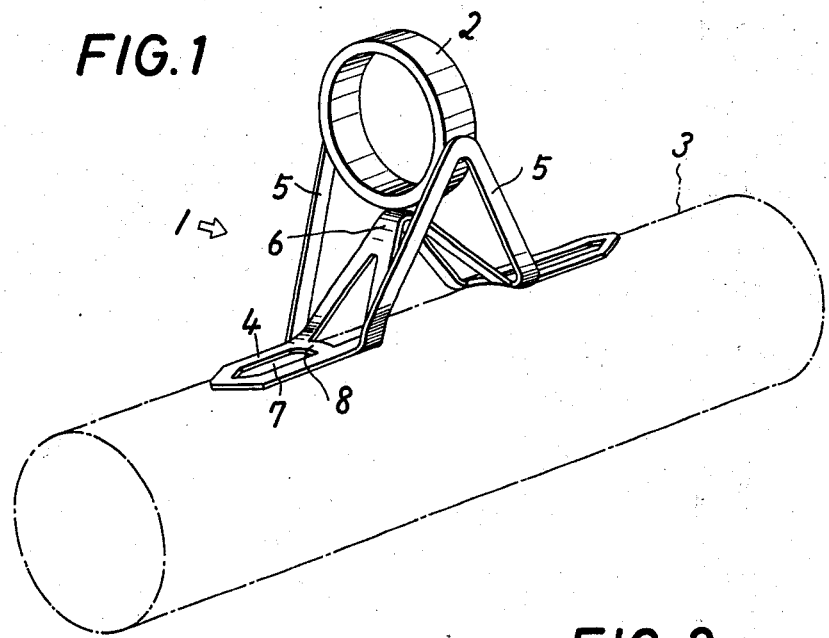

United States Patent [19]

Yamamoto

[11] 3,997,997
[45] Dec. 21, 1976

[54] LINE GUIDE RING FOR FISHING ROD

[75] Inventor: Shigeru Yamamoto, Higashikurume, Japan

[73] Assignee: Daiwa Seiko Incorporated, Higashikurume, Japan

[22] Filed: Nov. 26, 1975

[21] Appl. No.: 635,777

[52] U.S. Cl. .................................. 43/24
[51] Int. Cl.² ..................................... A01K 87/04
[58] Field of Search .......................... 43/24, 25, 18

[56] References Cited
UNITED STATES PATENTS
2,293,280    8/1942    Covington ............................ 43/24

FOREIGN PATENTS OR APPLICATIONS
1,184,340    2/1959    France ................................. 43/24
1,080,514    8/1967    United Kingdom .................. 43/24

OTHER PUBLICATIONS
The Sporting Goods Dealer, May 1966, "Varmac Mfg. Co." p. 173.

Primary Examiner—Warner H. Camp
Attorney, Agent, or Firm—Browdy and Neimark

[57] ABSTRACT

A line guide ring assembly designed for use on a fishing rod has a pair of fixing frames formed from a punched-out metal plate, a pair of inverted V-shaped ring holding frames formed integral with and in continuation to the rear ends of the fixing frames, said holding frames being bent up vertically to the rod, an X-shaped supporting frame also formed integral with and intermediate the fixing frames, the supporting frame being bent up centrally in the form of a mountain, and a line passing ring secured at its both sides to the upper portions of the inverted V-shaped holding frames and at its bottom to the top of the supporting frame.

3 Claims, 2 Drawing Figures

LINE GUIDE RING FOR FISHING ROD

This invention relates to an improved fishing line guide ring assembly adapted for use in attachment to a fishing rod for properly guiding the fishing line.

Generally, it is desirable that the line guide ring assembly attached to the fishing rod is as light as possible for the reasons of better operatability and smaller weight of the rod, and therefore the fixing leg for the assembly is usually formed from a single narrow strip of metal. However, such narrow strip-shaped fixing leg has the problem that the stability for the fishing rod could be impaired to cause dislocation in use. Also, the supporting frame adapted to support the guide ring assembly from below thereof is slimmed correspondingly to the narrow fixing leg, resulting in poor supporting capacity.

The present invention is intended to provide an improved fishing line guide ring structure which is free of the said problems, and it is therefore an object of the present invention to realize weight reduction of the fishing line guide ring assembly to minimize weight increment of the fishing rod while preventing lowering of the operatability of the rod.

It is another object of the present invention to provide a fishing line guide ring assembly which is extremely easy to manufacture by forming the fixing frames for fixing the ring assembly to the fishing rod, ring holding frames for holding and supporting the line-passing ring, and ring supporting frame, all integrally from a single piece of punched metal plate.

It is still another object of the present invention to provide a line guide ring assembly for fishing rod in which a pair of fixing frames secured to the fishing rod are formed widely to provide a large contact area with respect to the fishing rod so that they can be stably fixed to the rod with little fear of dislocation in use, and yet they are light in weight as they have their inside portions punched out.

It is also an object of the present invention to provide a line guide ring assembly for fishing rod in which the ring supporting frame designed for supporting the bottom portion of the line-passing ring is formed crosswise in integral continuation to the pair of fixing frames and the top of the centrally bent-up X-shaped frame is secured to the bottom of the line-passing ring so that said ring is stably and solidly supported by four pieces of frames, and this, coupled with sidewise holding by the holding frames, ensures stable and firm fixing of the line-passing ring to the supporting structure.

Figure 2:
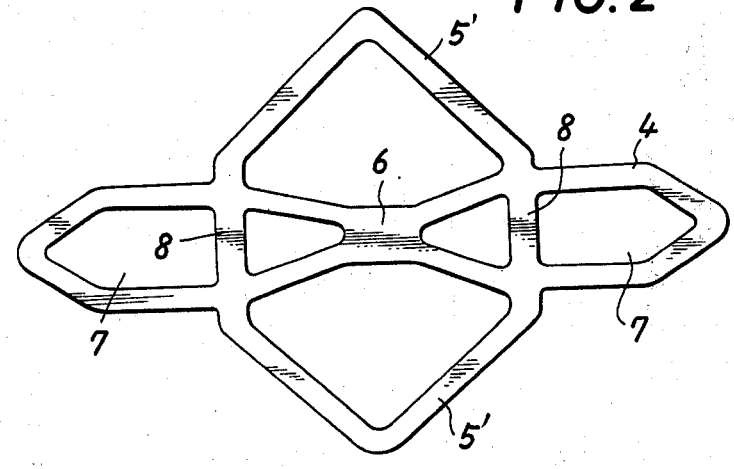

Now the present invention is described in detail with reference to the accompanying drawings, in which:

FIG. 1 is a perspective view of the device according to the present invention; and FIG. 2 is a plane view of a metal plate which has been punched out to form the line guide ring fixing and supporting structure in the device of the present invention.

The line guide ring supporting structure, generally designated by reference numeral 1, is formed by punching a single piece of metal such as stainless steel, brass, etc., as shown in FIG. 2 is a way to provide frame members for fixing a line-passing ring 2 to a fishing rod 3. It comprises fixing frames 4 which are to be fixed to the rod 3, ring holding frames 5 designed to externally hold and secure both side portions of the ring 2, and a ring supporting frame 6 designed to support the ring 2 from below thereof.

Said fixing frames 4 are provided in pair and positioned symmetrically on both sides of the central frame 6. They are formed wide and slightly curved along the rod surface. Also, they have their inside portions punched out to form spaces 7. A reinforcing bar 8 may be provided across each space 7 to additionally secure fixing.

The ring holding frames 5 are formed by uprightly bending up the V-shaped frame pieces 5' formed integral with and continuation to the rear parts of said fixing frames 4, so as to provide inverted V-shaped erect frames which are welded at the insides of their top parts to the corresponding external sides of the line-passing ring 2.

The ring supporting frame 6 is formed intermediate and integral continuation to said fixing frames 4, 4 and inside the ring holding frame 5, 5. It is X-shaped and centrally bent up in the form of a mountain, with the top thereof being welded to the bottom of the ring 2.

For securing this line guide ring assembly to the fishing rod 3, said pair of fixing frames 4, 4 are attached to a proper location on the rod and then fixed thereby tying it up by a fixing thread or such, and the fishing line is passed through the ring 2.

What is claimed is:

1. A line guide ring assembly for a fishing rod comprising a pair of fixing frames large in width and made from a punched metal plate, a pair of inverted V-shaped ring holding frames formed integral with and in continuation to rear portions of said fixing frames, said holding frames being bent up erect, an X-shaped ring supporting frame formed intermediate and in integral continuation to said fixing frames and positioned between said ring holding frames, said ring supporting frame being centrally bent up in the form of two inverted V-shaped portions which meet to define a top support surface, and a line-passing ring secured respectively at its respective sides to upper parts of respective ones of said inverted V-shaped ring holding frames and at its bottom to said top support surface of said centrally bentup ring supporting frame.

2. A line guide ring assembly for a fishing rod as set forth in claim 1, wherein reinforcing bars are provided across the punched-out portions of said pair of fixing frames.

3. A line guide ring assembly for a fishing rod as set forth in claim 1, wherein said pair of fixing frames are curved along the fishing rod surface.

* * * * *